(12) United States Patent
Hong (10) Patent No.: US 12,477,492 B2
(45) Date of Patent: Nov. 18, 2025

(54) INFORMATION PROCESSING METHOD AND APPARATUS, AND COMPUTER STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 683 days.

(21) Appl. No.: 17/620,080

(22) PCT Filed: Jun. 17, 2019

(86) PCT No.: PCT/CN2019/091599
§ 371 (c)(1),
(2) Date: Dec. 16, 2021

(87) PCT Pub. No.: WO2020/252643
PCT Pub. Date: Dec. 24, 2020

(65) Prior Publication Data
US 2022/0369262 A1    Nov. 17, 2022

(51) Int. Cl.
*H04W 56/00* (2009.01)
*H04W 8/18* (2009.01)
*H04W 74/0833* (2024.01)

(52) U.S. Cl.
CPC ....... *H04W 56/0045* (2013.01); *H04W 8/183* (2013.01); *H04W 74/0833* (2013.01)

(58) Field of Classification Search
CPC .............................................. H04W 56/0045
See application file for complete search history.

(56) References Cited

U.S. PATENT DOCUMENTS

| 8,274,938 | B2 | 9/2012 | Chang et al. |
| 9,363,633 | B2 | 6/2016 | Syrjarinne et al. |
| 10,034,320 | B2 | 7/2018 | Shi et al. |
| 10,187,781 | B2 * | 1/2019 | Kumar ................. H04W 76/36 |
| 10,397,897 | B2 * | 8/2019 | Balasubramaniam ....................... H04W 48/16 |
| 10,856,247 | B2 * | 12/2020 | He ..................... H04W 56/0045 |
| 2010/0304782 | A1 | 12/2010 | Chang et al. |

(Continued)

FOREIGN PATENT DOCUMENTS

| CN | 101902834 A | 12/2010 |
| CN | 109328484 A | 2/2019 |

(Continued)

OTHER PUBLICATIONS

International Search Report of PCT Application No. PCT/CN2019/091599 dated Mar. 11, 2020 with English translation, (4p).

*Primary Examiner* — Guang W Li
(74) *Attorney, Agent, or Firm* — Arch & Lake LLP; Hao Tan; Shen Wang (57) ABSTRACT

An information processing method. The method includes: determining that a trigger event of a first identity recognition module in a terminal is a preset trigger event, and determining that a second identity recognition module in the terminal has an effective timing advance (TA) value; then, controlling the first identity recognition module not to initiate random access, and determining the TA value of the second identity recognition module as the TA value of the first identity recognition module.

13 Claims, 5 Drawing Sheets

(56) References Cited

U.S. PATENT DOCUMENTS

| | | | |
|---|---|---|---|
| 2014/0369322 A1* | 12/2014 | Fwu | H04L 5/003 |
| | | | 370/336 |
| 2015/0312869 A1* | 10/2015 | Lee | H04W 56/004 |
| | | | 370/329 |
| 2016/0381710 A1* | 12/2016 | Bansal | H04W 72/12 |
| | | | 370/336 |
| 2017/0223589 A1* | 8/2017 | Lee | H04W 60/005 |
| 2017/0374686 A1 | 12/2017 | Agarwal et al. | |
| 2018/0035397 A1* | 2/2018 | Xie | H04W 72/51 |
| 2018/0077728 A1* | 3/2018 | Shi | H04W 76/10 |
| 2018/0160422 A1* | 6/2018 | Pathak | H04W 76/10 |
| 2018/0288732 A1* | 10/2018 | Balasubramaniam | H04W 76/19 |
| 2018/0324754 A1 | 11/2018 | Ryu et al. | |
| 2020/0015263 A1* | 1/2020 | Huang | H04W 72/0446 |
| 2020/0029326 A1* | 1/2020 | Wang | H04W 56/0045 |
| 2020/0351818 A1* | 11/2020 | Park | H04W 52/0216 |
| 2021/0045163 A1* | 2/2021 | Chai | H04L 27/2646 |
| 2021/0212009 A1* | 7/2021 | Wu | H04W 56/0045 |
| 2022/0369262 A1* | 11/2022 | Hong | H04W 56/0045 |

FOREIGN PATENT DOCUMENTS

| | | | |
|---|---|---|---|
| CN | 109691219 A | 4/2019 | |
| WO | WO-2017128098 A1 * | 8/2017 | H04W 56/0045 |

* cited by examiner

INFORMATION PROCESSING METHOD AND APPARATUS, AND COMPUTER STORAGE MEDIUM

CROSS-REFERENCE TO RELATED APPLICATION

The present application is a U.S. National Phase of International Patent Application Serial No. PCT/CN2019/091599 filed on Jun. 17, 2019, the entire content of which is hereby incorporated by reference in its entirety for all purposes.

BACKGROUND

At present, processing methods for multi-card terminals are mainly based on the implementation of various terminal manufacturers, and there is no uniform standard for regulation, which results in many different terminal behaviors and processing methods, such as dual-card single-standby, dual-card dual-standby single-pass, dual-card dual-standby dual-pass, and the like.

SUMMARY

The present disclosure relates to a communication technology, and in particular relates to an information processing method and apparatus, and a computer storage medium.

The present disclosure provides an information processing method and apparatus, and a computer storage medium.

According to a first aspect of the present disclosure, an information processing method is provided, including: determining a trigger event of a first identity recognition module in a terminal is a preset trigger event; determining a second identity recognition module in the terminal has an effective timing advance (TA) value; controlling, the first identity recognition module not to initiate random access, and determining the TA value of the second identity recognition module as the TA value of the first identity recognition module.

According to a second aspect of the present disclosure, provided is an information processing apparatus, including: a processor; and a memory, configured to store processor-executable instructions; where, the processor is configured to implement the information processing method described in the first aspect of the disclosure by executing the executable instructions.

According to a third aspect of the present disclosure, provided is a computer storage medium, having executable instructions stored therein, where, after the executable instructions are executed by a processor, the information processing method described in the first aspect of the present disclosure can be implemented.

It should be understood that both the foregoing general description and the following detailed description are exemplary and explanatory only and are not intended to limit the present disclosure.

BRIEF DESCRIPTION OF THE DRAWINGS

The accompanying drawings herein are incorporated into the description and constitute a part of the description, illustrate examples consistent with the present disclosure, and are used together with the description to explain the principles of the present disclosure.

DETAILED DESCRIPTION

The examples will be described in detail here, and examples thereof are shown in the accompanying drawings. When the following description refers to the accompanying drawings, unless otherwise indicated, the same numbers in different accompanying drawings represent the same or similar elements. The implementations described in the following examples do not represent all implementations consistent with the present disclosure. On the contrary, they are merely examples of apparatuses and methods consistent with some aspects of the examples of the present disclosure described in detail in the appended claims.

The terms used in the examples of the present disclosure are only for the purpose of describing particular examples and are not intended to limit the present disclosure. The singular forms "a", "an", and "the" used in the disclosure and the appended claim are intended to include the plural forms as well, unless the context clearly indicates otherwise. It should also be understood that the term "and/or" used herein refers to and includes any or all possible combinations of one or more associated listed items.

It should be understood that although the terms first, second, third, etc. may be employed to describe various information in the present disclosure, such information should not be limited to these terms. These terms are only used to distinguish the same type of information from each other. For example, first information may also be referred to as second information, and, similarly, the second information may also be referred to as the first information without departing from the scope of the examples of the present disclosure. As used herein, the word "if" may be interpreted as "upon" or "when" or "in response to determining," depending on the context.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

At present, processing methods for multi-card terminals are mainly based on the implementation of various terminal manufacturers, and there is no uniform standard for regulation, which results in many different terminal behaviors and processing methods, such as dual-card single-standby, dual-card dual-standby single-pass, dual-card dual-standby dual-pass, and the like. In the related art, multiple cards of the multi-card terminal independently decide whether to perform random access in accordance with a trigger event, resulting in a waste of resources, including network resources and terminal power.

Figure 1:
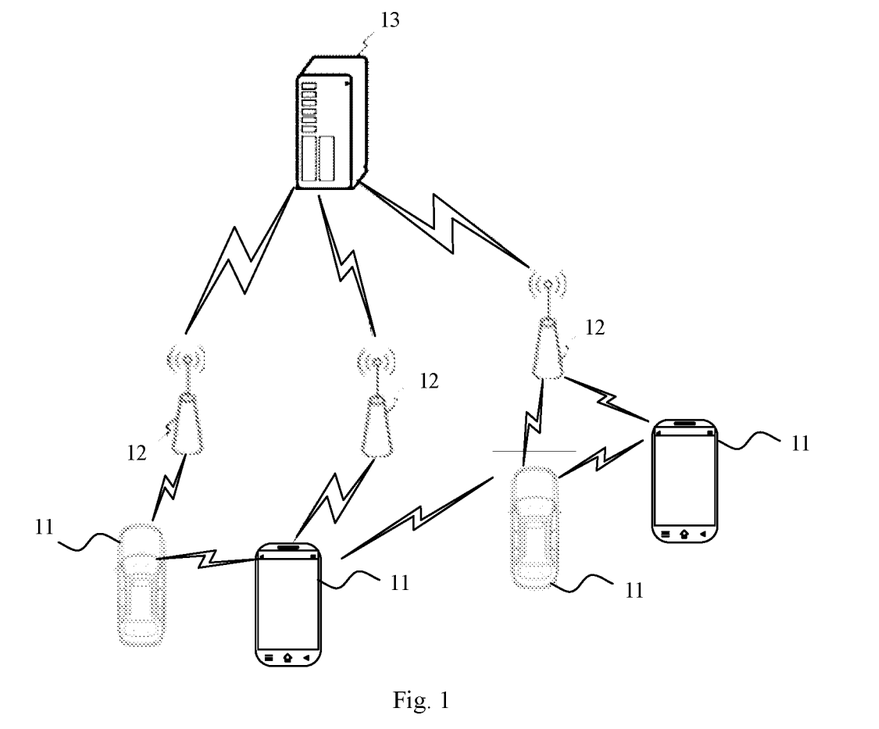
FIG. 1 is a structural schematic diagram of a wireless communication system according to one example.

Referring to FIG. 1, a structural schematic diagram of a wireless communication system provided by the examples of the present disclosure is shown. As shown in FIG. 1, the wireless communication system is a communication system based on a cellular mobile communication technology, and may include a plurality of terminals 11 and a plurality of base stations 12.

Each terminal 11 may be a device providing voice and/or data connectivity to a user. The terminals 11 may be in communication with one or more core networks via radio access networks (RANs), and the terminals 11 may be Internet of Things terminals such as sensor devices, mobile phones (or referred to as "cellular" phones) and computers having Internet of Things terminals, and may be, for example, stationary, portable, pocket, hand-held, computer-built or vehicle-mounted devices. For example, a station (STA), a subscriber unit, a subscriber station, a mobile station, a mobile, a remote station, an access point, a remote terminal, an access terminal, a user terminal, a user agent, a user device, or user equipment (UE). Alternatively, each terminal 11 may also be a device of an unmanned aerial vehicle. Alternatively, each terminal 11 may also be a vehicle-mounted device, and may be, for example, a trip computer with a wireless communication function, or a wireless communication device externally connected with a trip computer. Alternatively, each terminal 11 may also be an infrastructure, and may be, for example, a street light, a signal light, or other infrastructures having a wireless communication function.

Each base station 12 may be a network side device in a wireless communication system. The wireless communication system may be the 4th generation mobile communication (4G) system, also referred to as a long term evolution (LTE) system; alternatively, the wireless communication system may also be a 5G system, also referred to as a new radio (NR) system or a 5G NR system. Alternatively, the wireless communication system may also be a next generation system of the 5G system. The access network in the 5G system may be referred to as New Generation-Radio Access Network (NG-RAN). Or a Machine-Type communication (MTC) system.

Each base station 12 may be an evolved base station (eNB) employed in the 4G system. Alternatively, each base station 12 may also be a next generation base station (gNB) employing a centrally distributed architecture in the 5G system. When each base station 12 employs a centrally distributed architecture, the base station 12 typically includes a central unit (CU) and at least two distributed units (DU). A protocol stack of a packet data convergence protocol (PDCP) layer, a radio link control (RLC) layer, and a media access control (MAC) layer is disposed in the central unit; a protocol stack of a physical (PHY) layer is disposed in each distributed unit, and the examples of the present disclosure do not limit the particular implementation of the base stations 12.

A wireless connection may be established between the base stations 12 and the terminals 11 through wireless air interface. In different examples, the wireless air interface is wireless air interface based on a 4th generation mobile communication network technology (4G) standard; alternatively, the wireless air interface is wireless air interface based on a 5th generation mobile communication network technology (5G) standard, for example, the wireless air interface is new air interface; alternatively, the wireless air interface may also be wireless air interface based on a more next generation mobile communication network technology standard of 5G.

In some examples, E2E (End to End) connections may also be established between the terminals 11. For example, in scenarios such as V2V (Vehicle to Vehicle) communication, V2I (Vehicle to Infrastructure) communication, and V2P (Vehicle to Pedestrian) communication in V2X (Vehicle to Everything) communication.

In some examples, the wireless communication system described above may also contain a network management device 13.

The plurality of the base stations 12 are each connected to the network management device 13. The network management device 13 may be a core network device in the wireless communication system, for example, the network management device 13 may be a mobility management entity (MME) in an evolved packet core (EPC). Alternatively, the network management device may also be other core network devices, such as a serving gate way (SGW), a public data network gate way (PGW), a policy and charging rules function (PCRF), or a home subscriber server (HSS), etc. The examples of the present disclosure do not limit the implementation form of the network management device 13.

In the related art, each card on a multi-card terminal independently decides whether to perform random access in accordance with a trigger event. Based on the above described wireless communication system, how to reduce waste of resources, including waste of network resources and terminal power, various examples of the method of the present disclosure are proposed.

Figure 2:
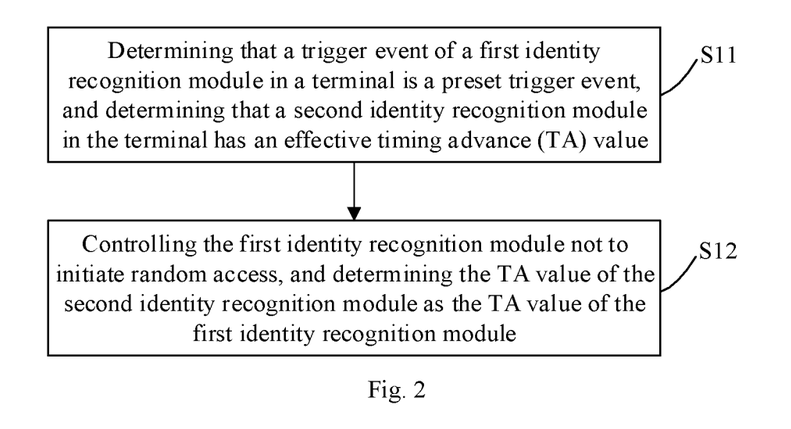
FIG. 2 is a flow diagram 1 of an information processing method according to one example.

FIG. 2 is a flow diagram 1 of an information processing method according to one example, and as shown in FIG. 2, the information processing method is used in a terminal, and includes the following steps.

In step S11, it is determined that a trigger event of a first identity recognition module in a terminal is a preset trigger event, and it is determined that the second identity recognition module in the terminal has an effective TA value.

The trigger event is configured to cause random access.

In the examples of the present disclosure, the terminal has at least two identity recognition modules.

Optionally, the user identity recognition module may be a subscriber identification module (SIM) card, a user identity module (UIM) card, or the like, and the user identity recognition module carries network access authentication information and the like.

In the examples of the present disclosure, the first identity recognition module and the second identity recognition module are two independent identity recognition modules.

Exemplarily, the first identity recognition module is a SIM card 1 and the second identity recognition module is a SIM card 2.

Exemplarily, the first identity recognition module is a UIM card 1 and the second identity recognition module is a UIM card 2.

The communication network corresponding to the first identity recognition module and the communication network corresponding to the second identity recognition module belong to a same operator network.

It should be noted that the communication network may be 2G, 3G, 4G, 5G or the like.

Here, there are a variety of trigger events that cause random access, which are specifically recorded in the description of the next example and are not described again here.

It should be noted that the disclosure does not limit a manner of obtaining the trigger event.

In some optional examples, the preset trigger event includes:

Downlink (DL) or uplink (UL) data arrival during radio resource control connected (RRC_CONNECTED) when an uplink (UL) synchronization status is non-synchronized.

The preset trigger event may be expressed as: DL or UL data arrival during RRC_CONNECTED when UL synchronization status is "non-synchronized".

That is, the preset trigger event may be understood as DL or UL data arrival during RRC_CONNECTED when the UL synchronization status is "non-synchronized".

In the related art, for DL data arrival, when UE is in a RRC_CONNECTED status, the base station has DL data that needs to be transmitted to the UE, but it is found that the UE is in a UL out-of-sync state, and the base station will control the UE to initiate random access. The UE obtains a TA value by initiating random access, hence performing subsequent reception of DL data according to the TA value.

In the related art, for UL data arrival, when UE is in a RRC_CONNECTED status, the UE has UL data that needs to be transmitted to the base station, but it is found that the UE is in a UL out-of-sync state, and the UE will initiate random access. The UE obtains a TA value by initiating random access, hence performing subsequent transmission of UL data according to the TA value.

It can be seen that the preset trigger event will cause the UE to initiate random access, and the purpose of initiating random access by the UE is to obtain the TA value.

In some optional examples, whether the trigger event of the first identity recognition module is a preset trigger event is first determined, and in response to the trigger event is the preset trigger event, whether the second identity recognition module has an effective TA value is then determined.

In some optional examples, a process of determining whether the second identity recognition module in the terminal has an effective TA value may include:

determining whether the second identity recognition module has a TA value;

determining that the second identity recognition module does not have the effective TA value if the second identity recognition module does not have the TA value; and determining whether the TA value is an effective TA value according to a communication status of the second identity recognition module if the second identity recognition module has the TA value.

In some optional examples, determining whether the TA value is the effective TA value according to the communication status of the second identity recognition module includes:

determining that the TA value of the second identity recognition module is the effective TA value if the second identity recognition module is in a state of being in data transmission with its communication network.

In some optional examples, determining whether the TA value is the effective TA value according to the communication status of the second identity recognition module includes:

determining that the TA value of the second identity recognition module is an ineffective TA value, when the second identity recognition module is in an idle state or an inactive state, or in a non-synchronized status in a connected state.

In step S12, the first identity recognition module is controlled not to initiate random access and the TA value of the second identity recognition module is determined as the TA value of the first identity recognition module.

It should be noted that "determining the TA value of the second identity recognition module as the TA value of the first identity recognition module" and "controlling the first identity recognition module not to initiate random access" in step S12 are performed in no sequence. For example, both may be performed simultaneously. For another example, controlling the first identity recognition module not to initiate random access may be performed before determining the TA value of the second identity recognition module as the TA value of the first identity recognition module. As another example, determining the TA value of the second identity recognition module as the TA value of the first identity recognition module may be performed before controlling the first identity recognition module not to initiate random access.

In the above solution, the method further includes:

determining that the trigger event is a non-preset trigger event, and then, controlling the first identity recognition module to initiate random access to a communication network to obtain an effective TA value.

Thus, in the case that the trigger event is a non-preset trigger event, the first identity recognition module initiates random access to the communication network based on the trigger event to obtain an effective TA value.

In the above solution, the method further includes:

determining that the trigger event is a preset trigger event, and determining that the second identity recognition module does not have an effective TA value, and then, controlling the first identity recognition module to initiate random access to a communication network to obtain an effective TA value.

Thus, in the case that the trigger event is a preset trigger event but the second identity recognition module does not have an effective TA value, the first identity recognition module initiates random access to the communication network based on the preset trigger event to obtain an effective TA value.

In accordance with the technical solutions of the present disclosure, if the second identity recognition module in the terminal has an effective TA value, the first identity recognition module does not initiate random access to obtain the TA value based on a preset trigger event but instead obtains the TA value of the second identity recognition module, thus avoiding waste of resources including network resources and terminal power.

Figure 3:
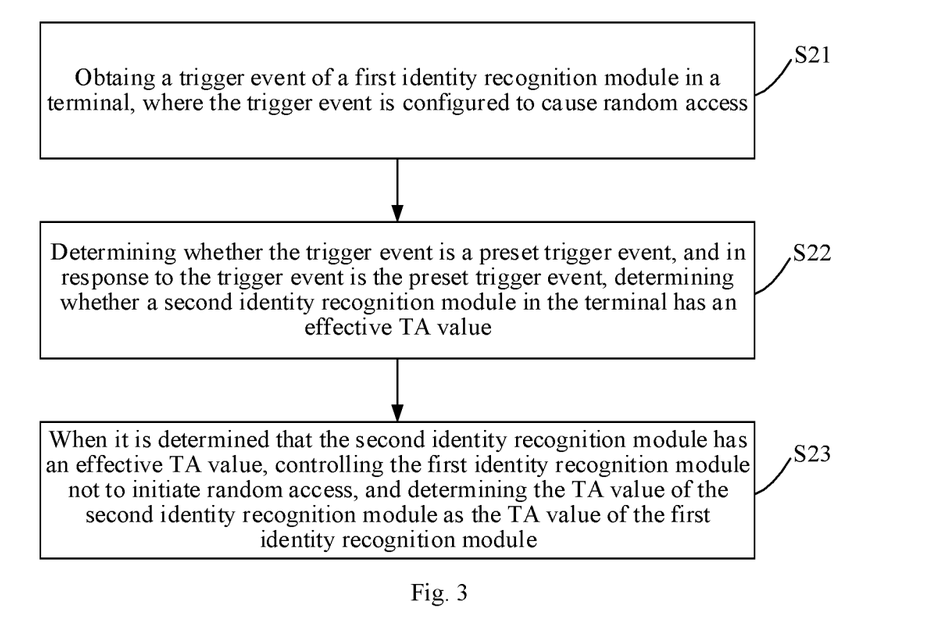
FIG. 3 is a flow diagram 2 of an information processing method according to one example.

FIG. 3 is a flow diagram 2 of an information processing method according to one example, and as shown in FIG. 3, the information processing method is used in a terminal, and includes the following steps.

In step S21, a trigger event of a first identity recognition module in a terminal is obtained, where the trigger event is configured to cause random access.

In the examples of the present disclosure, the terminal has at least two identity recognition modules.

Optionally, the user identity recognition module may be a SIM card, a UIM card, or the like, and the user identity recognition module carries network access authentication information and the like.

Here, there are a variety of trigger events that cause random access.

For instance, the trigger event is: initial access from RRC_IDLE.

For instance, the trigger event is RRC connection re-establishment procedure.

For instance, the trigger event is: handover.

For instance, the trigger event is: DL or UL data arrival during RRC_CONNECTED when UL synchronization status is non-synchronized.

For instance, the trigger event is: UL data arrival during RRC_CONNECTED when there are no physical uplink control channel (PUCCH) resources for scheduling request (SR) available.

For instance, the trigger event is a failure of an uplink scheduling request.

For instance, the trigger event is: request by RRC upon synchronous reconfiguration.

For instance, the trigger event is transition from RRC_INACTIVE.

For instance, the trigger event is to establish time alignment at secondary cell (Scell) addition.

For instance, the trigger event is: other service integrator (SI) request.

For instance, the trigger event is: beam failure recovery.

It should be noted that the disclosure does not limit a manner of obtaining the trigger event.

In step S22, it is determined whether the trigger event is a preset trigger event, and in response to the trigger event is the preset trigger event, it is determined whether a second identity recognition module in the terminal has an effective TA value.

In the examples of the present disclosure, the second identity recognition module and the first identity recognition module are two independent identity recognition modules.

Exemplarily, the first identity recognition module is a SIM card 1 and the second identity recognition module is a SIM card 2.

Exemplarily, the first identity recognition module is a UIM card 1 and the second identity recognition module is a UIM card 2.

The communication network corresponding to the first identity recognition module and the communication network corresponding to the second identity recognition module belong to a same operator network.

In some optional examples, the preset trigger event includes:

DL or UL data arrival during radio resource control connected (RRC_CONNECTED) when an UL synchronization status is non-synchronized.

It can be seen that the preset trigger event will cause the UE to initiate random access, and the purpose of initiating random access by the UE is to obtain the TA value.

In some optional examples, determining whether the second identity recognition module in the terminal has the effective TA value includes:

determining whether the second identity recognition module has a TA value;

determining that the second identity recognition module does not have the effective TA value if the second identity recognition module does not have the TA value; and determining whether the TA value is an effective TA value according to a communication status of the second identity recognition module if the second identity recognition module has the TA value.

In some optional examples, determining whether the TA value is the effective TA value according to the communication status of the second identity recognition module includes:

determining that the TA value of the second identity recognition module is the effective TA value if the second identity recognition module is in a state of being in data transmission with its communication network.

In some optional examples, determining whether the TA value is the effective TA value according to the communication status of the second identity recognition module includes:

determining that the TA value of the second identity recognition module is an ineffective TA value, when the second identity recognition module is in an idle state or an inactive state, or in a non-synchronized status in a connected state.

In step S23, when it is determined that the second identity recognition module has an effective TA value, the first identity recognition module is controlled not to initiate random access, and the TA value of the second identity recognition module is determined as the TA value of the first identity recognition module.

In this way, in response to the second identity recognition module in the terminal has an effective TA value, the first identity recognition module does not initiate random access to obtain the TA value based on the trigger event, but instead obtains the TA value of the second identity recognition module, so that waste of resources, including network resources and terminal power, is avoided.

In some optional examples, the means of obtaining an effective TA value of the second identity recognition module includes:

sending an inquiry request to the second identity recognition module by the first identity recognition module; where, the inquiry request is configured to inquire whether the second identity recognition module has an effective TA value; and receiving a TA value fed back by the second identity recognition module based on the inquiry request by the first identity recognition module.

Thus, the first identity recognition module may actively send an inquiry request to the second identity recognition module to determine whether the second identity recognition module has an effective TA value.

In some optional examples, the means of obtaining the effective TA value of the second identity recognition module includes:

receiving an effective TA value of the second identity recognition module broadcasted out by the second identity recognition module.

Thus, the second identity recognition module broadcasts out an effective TA value, and the first identity recognition module may receive and obtain the effective TA value broadcasted by the second identity recognition module when the trigger event is a preset trigger event.

It should be noted that the present disclosure does not limit the information interaction or inquiry manner between various identity recognition modules in the terminal, which may be, for example, implemented by software; and may also be, for another example, implemented by protocol.

In the above solution, the method further includes:

controlling the first identity recognition module to initiate random access to a communication network to obtain an effective TA value if the trigger event is a non-preset trigger event.

Thus, in the case that the trigger event is a non-preset trigger event, the first identity recognition module initiates random access to the communication network based on the trigger event to obtain an effective TA value.

In the above solution, the method further includes:

controlling the first identity recognition module to initiate random access to a communication network to obtain an effective TA value if the trigger event is a preset trigger event and the second identity recognition module does not have an effective TA value.

Thus, in the case that the trigger event is a preset trigger event but the second identity recognition module does not have an effective TA value, the first identity recognition module initiates random access to the communication network based on the preset trigger event to obtain the effective TA value.

In the above solution, after determining the TA value of the second identity recognition module as the TA value of the first identity recognition module, the method may further include:

informing the first identity recognition module about the TA value, so that the first identity recognition module uses the TA value for transmission of uplink data.

Thus, the first identity recognition module uses the TA value obtained from the second identity recognition module for the transmission of uplink data, hence avoiding wasting communication network resources and saving terminal power.

In the above solution, after determining the TA value of the second identity recognition module as the TA value of the first identity recognition module, the method may further include:

informing the first identity recognition module about the TA value, so that the first identity recognition module uses the TA value for reception of downlink data after determining the TA value of the second identity recognition module as the TA value of the first identity recognition module.

Thus, the first identity recognition module uses the TA value obtained from the second identity recognition module for the reception of downlink data, avoiding wasting communication network resources and saving terminal power.

For the case where multiple SIM cards of the multi-card terminal belong to the same operator network, when a certain SIM card wants to trigger random access to obtain a TA value, if other SIM cards belonging to the terminal store the TA value required by the SIM card, the SIM card is directly informed; or the SIM card obtains the TA value required by the SIM card from the other SIM cards, thus avoiding the SIM card to re-initiate random access, hence avoiding waste of resources, including network resources and terminal power.

In the following, two SIM cards of a dual-card terminal belong to a same operator as an example.

Figure 4:
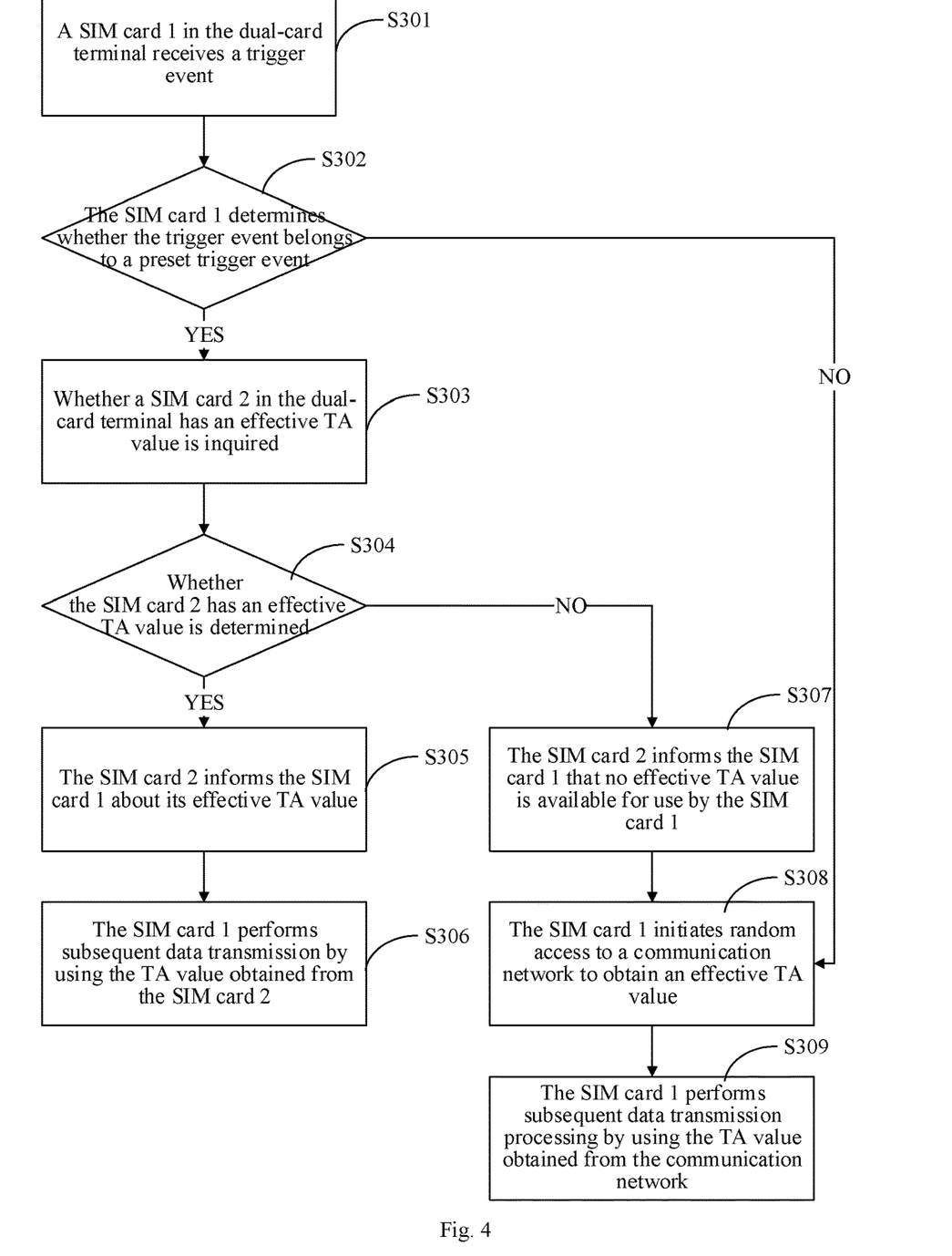
FIG. 4 is a flow diagram of obtaining a TA value by a dual-card terminal according to one example.

FIG. 4 is a flow diagram of obtaining a TA value by a dual-card terminal according to one example, and as shown in FIG. 4, a process for obtaining TA includes the following steps:

Step S301: a SIM card 1 in the dual-card terminal receives a trigger event and then a step S302 is performed;

Step S302: the SIM card 1 determines whether the trigger event belongs to a preset trigger event, if yes, a step S303 is performed, and if not, a step S308 is performed;

Step S303: whether a SIM card 2 in the dual-card terminal has an effective TA value is inquired, and then a step S304 is performed;

Step S304: whether the SIM card 2 has an effective TA value is determined, and if yes, a step S305 is performed, and if not, a step S307 is performed;

Step S305: the SIM card 2 informs the SIM card 1 about its effective TA value, and then a step S306 is performed;

Step S306: the SIM card 1 performs subsequent data transmission by using the TA value obtained from the SIM card 2 and then the entire process is ended;

Step S307: the SIM card 2 informs the SIM card 1 that no effective TA value is available for use by the SIM card 1 and then a step S308 is performed;

Step S308: the SIM card 1 initiates random access to a communication network to obtain an effective TA value, and then a step S309 is performed; and Step S309: the SIM card 1 performs subsequent data transmission processing by using the TA value obtained from the communication network, and then the entire process is ended.

For example, if a certain SIM card (denoted as a SIM card 1) of the dual-card terminal needs to initiate random access to obtain a TA value because of a trigger event of DL or UL data arrival during RRC_CONNECTED when UL synchronization status is non-synchronized, then the SIM card 1 first needs to inquire whether another SIM card (denoted as a SIM card 2) of the dual-card terminal has an effective TA value, and if the SIM card 2 has the effective TA value, for example, the SIM card 2 is being in data transmission with the base station, the SIM card 2 informs the SIM card 1 about its effective TA value, and the SIM card 1 uses the TA value informed by the SIM card 2 for subsequent transmission of uplink data. If the SIM card 2 does not have the effective TA value, for example, the SIM card 2 is in an IDLE or INACTIVE state, or in a non-synchronized status although in a CONNECTED state, the SIM card 1 initiates random access itself in order to obtain effective TA.

It should be understood that the example shown in FIG. 4 is an optional specific implementation, but is not limited thereto.

It should also be understood that the example of FIG. 4 is only for illustrating the examples of the present disclosure and various obvious changes and/or substitutions may be made by those skilled in the art based on the example of FIG. 4, and the obtained technical solution still falls within the scope of the disclosure of the present disclosure.

Figure 5:
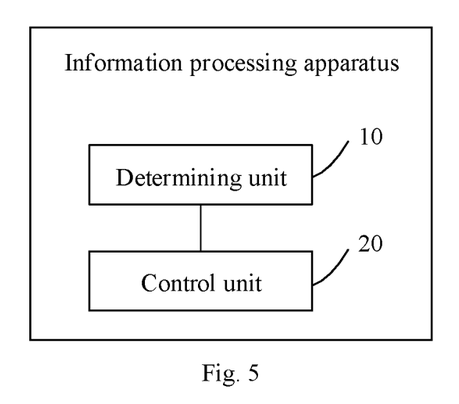
FIG. 5 is a block diagram of an information processing apparatus according to one example.

FIG. 5 is a block diagram of an information processing apparatus according to one example. Referring to FIG. 5, the apparatus includes a determining unit 10 and a control unit 20.

The determining unit 10 is configured to determine whether a trigger event of a first identity recognition module in a terminal is a preset trigger event, and determine whether a second identity recognition module in the terminal has an effective TA value, where the trigger event is configured to cause random access; and the control unit 20 is configured to control the first identity recognition module not to initiate random access and determine the TA value of the second identity recognition module as the TA value of the first identity recognition module when the determining unit 10 determines that the trigger event is the preset trigger event and determines that the second identity recognition module has the effective TA value.

In some optional examples, the control unit 20 is further configured to:

control the first identity recognition module to initiate random access to a communication network to obtain an effective TA value when the determining unit 10 determines that the trigger event is a non-preset trigger event; or control the first identity recognition module to initiate random access to a communication network to obtain an effective TA value when the determining unit 10 determines that the trigger event is a preset trigger event and the second identity recognition module does not have an effective TA value.

Optionally, the preset trigger event includes:

DL or UL data arrival during radio resource control connected (RRC_CONNECTED) when an UL synchronization status is non-synchronized.

In some optional examples, the determining unit 10 is further configured to:

whether the trigger event of the first identity recognition module is a preset trigger event is first determined, and in response to the trigger event is the preset trigger event, whether the second identity recognition module has an effective TA value is then determined.

In some optional examples, the determining unit 10 is further configured to:

determining whether the second identity recognition module has a TA value;

determining that the second identity recognition module does not have an effective TA value if the second identity recognition module does not have the TA value; and determining whether the TA value is an effective TA value according to a communication status of the second identity recognition module if the second identity recognition module has the TA value.

In some optional examples, the determining unit 10 is further configured to:

determine that the TA value of the second identity recognition module is an effective TA value if the second identity recognition module is in a state of being in data transmission with its communication network.

In some optional examples, the determining unit 10 is further configured to:

determine that the TA value of the second identity recognition module is an ineffective TA value, when the second identity recognition module is in an idle state or an inactive state, or in a non-synchronized status in a connected state.

The communication network corresponding to the first identity recognition module and the communication network corresponding to the second identity recognition module belong to a same operator network.

The communication network includes, but is not limited to, 2G, 3G, 4G, 5G, and other networks.

In some optional examples, the control unit 20 is further configured to:

inform the first identity recognition module about the TA value, so that the first identity recognition module uses the TA value for transmission of uplink data after determining the TA value of the second identity recognition module as the TA value of the first identity recognition module.

In one optional example, the control unit 20 is further configured to:

inform the first identity recognition module about the TA value, so that the first identity recognition module uses the TA value for reception of downlink data after determining the TA value of the second identity recognition module as the TA value of the first identity recognition module.

With respect to the apparatus in the above-described examples, the specific manner in which the various modules perform the operations has been described in detail in the examples of the method, and will not be explained in detail herein.

In practical applications, the specific configurations of the determining unit 10 and the control unit 20 described above may be implemented by a central processing unit (CPU), a micro controller unit (MCU), digital signal processing (DSP), a programmable logic controller (PLC), or the like in the information processing apparatus or a terminal to which the information processing apparatus belongs.

The information processing apparatus according to this example may be disposed at a terminal side.

It should be understand by those skilled in the art that the functions of various processing modules in the information processing apparatus according to the examples of the present disclosure can be understood with reference to the relevant description of the above information processing method, the processing modules in the information processing apparatus of the examples of the present disclosure may be implemented by an analog circuit implementing the functions described in the examples of the present disclosure, or may be implemented by the operation of software executing the functions described in the examples of the present disclosure on a terminal.

According to the information processing apparatus according to the examples of the present disclosure, the first identity recognition module does not initiate random access based on the preset trigger event but obtains the TA value from the second identity recognition module when the trigger event is the preset trigger event, hence avoiding wasting communication network resources and saving terminal power.

Figure 6:
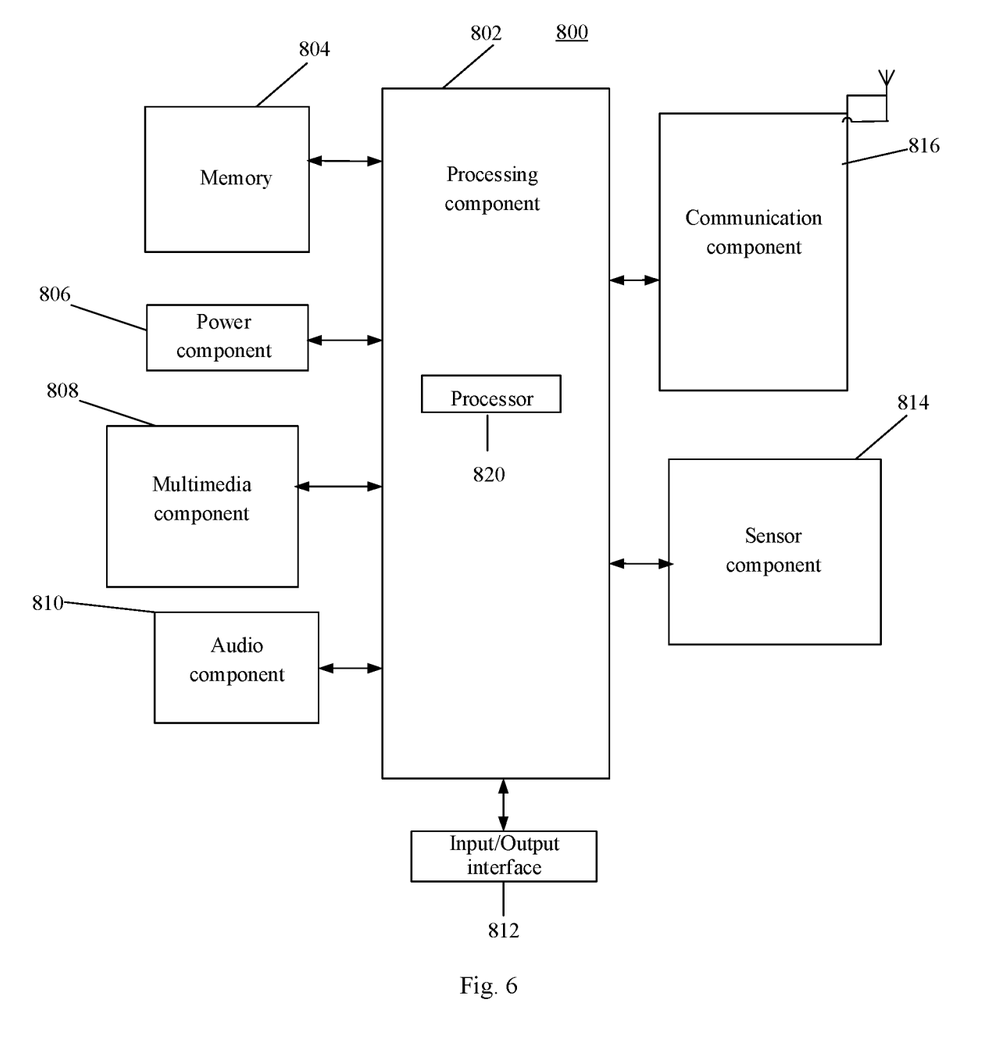
FIG. 6 is a block diagram of an apparatus for implementing information processing according to one example.

FIG. 6 is a block diagram of an apparatus for implementing information processing according to one exemplary example. For example, the apparatus 800 may be a mobile phone, a computer, a digital broadcast terminal, a message transceiving device, a game console, a tablet device, a medical device, a fitness device, a personal digital assistant, or the like.

Referring to FIG. 6, the apparatus 800 may include one or more of a processing component 802, a memory 804, a power component 806, a multimedia component 808, an audio component 810, an input/output (I/O) interface 812, a sensor component 814, and a communication component 816.

The processing component 802 generally controls the overall operation of the apparatus 800, such as operations associated with display, phone calls, data communication, camera operations, and recording operations. The processing component 802 may include one or more processors 820 to execute instructions to perform all or part of the steps of the method described above. Further, the processing component 802 may include one or more modules that facilitate interaction between the processing component 802 and other components. For example, the processing component 802 may include a multimedia module to facilitate interaction between the multimedia component 808 and the processing component 802.

The memory 804 is configured to store various types of data to support operations at the apparatus 800. Examples of such data include instructions for any application or method operating on the apparatus 800, contact data, phonebook data, messages, pictures, video, etc. The memory 804 may be implemented by any type of volatile or non-volatile memory device, or a combination thereof, such as a static random-access memory (SRAM), an electrically-erasable programmable read only memory (EEPROM), an erasable programmable read only memory (EPROM), a programmable read-only memory (PROM), a read only memory (ROM), a magnetic memory, a flash memory, a magnetic disk, or an optical disk.

The power component 806 provides power to various components of the apparatus 800. The power component 806 may include a power management system, one or more power sources, and other components associated with the generation, management, and distribution of power for the apparatus 800.

The multimedia component 808 includes a screen that provides an output interface between the apparatus 800 and a user. In some examples, the screen may include a liquid crystal display (LCD) and a touch panel (TP). If the screen includes the touch panel, the screen may be implemented as a touch screen to receive input signals from a user. The touch panel includes one or more touch sensors to sense touch, sliding, and gestures on the touch panel. The touch sensor may not only sense a boundary of a touch or sliding action, but also detect a duration and pressure associated with the touch or sliding operation. In some examples, the multimedia component 808 includes a front camera and/or a rear camera. The front camera and/or the rear camera may receive external multimedia data when the apparatus 800 is in an operational mode, such as a shooting mode or a video mode. Each front camera and back camera may be a fixed optical lens system or have focal length and optical zoom capabilities.

The audio component 810 is configured to output and/or input audio signals. For example, the audio component 810 includes a microphone (MIC) configured to receive external audio signals when the apparatus 800 is in an operational mode, such as a call mode, a recording mode, and a voice recognition mode. The received audio signals may be further stored in the memory 804 or transmitted via the communication component 816. In some examples, the audio component 810 also includes a speaker for outputting audio signals.

The I/O interface 812 provides an interface between the processing component 802 and peripheral interface modules such as keyboards, click wheels, buttons, and the like. These buttons may include, but are not limited to, a home button, a volume button, a start button, and a lock button.

The sensor assembly 814 includes one or more sensors for providing status assessment of various aspects of the apparatus 800. For example, the sensor component 814 may detect an open/close state of the apparatus 800, and relative positioning of the components, such as the display and keypad of the apparatus 800, the sensor component 814 may also detect changes in the position of the apparatus 800 or one component of the apparatus 800, the presence or absence of user contact with the apparatus 800, apparatus 800 orientation or acceleration/deceleration, and temperature changes of the apparatus 800. The sensor component 814 may include a proximity sensor configured to detect the presence of nearby objects in the absence of any physical contact. The sensor component 814 may also include a light sensor, such as a complementary metal oxide semiconductor (CMOS) or a charge-coupled device (CCD) image sensor, for use in imaging applications. In some examples, the sensor component 814 may also include an acceleration sensor, a gyro sensor, a magnetic sensor, a pressure sensor, or a temperature sensor.

The communication component 816 is configured to facilitate communication between the apparatus 800 and other devices in a wired or wireless manner. The apparatus 800 may access a wireless network based on a communication standard, such as Wi-Fi, 2G, or 3G, or a combination thereof. In one exemplary example, the communication component 816 receives broadcast signals or broadcast related information from an external broadcast management system via a broadcast channel. In one exemplary example, the communication component 816 also includes a near field communication (NFC) module to facilitate short range communication. For example, the NFC module may be implemented based on a radio frequency identification (RFID) technology, an infrared data association (IrDA) technology, an ultra-wide band (UWB) technology, a Blue Tooth (BT) technology, and other technologies.

In exemplary examples, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above-described method.

In exemplary examples, also provided is a non-transitory computer storage medium including executable instructions, such as the memory 804 including executable instructions executable by the processor 820 of the apparatus 800 to carry out the method described above. For example, the non-transitory computer storage medium may be a ROM, a random access memory (RAM), a CD-ROM, a magnetic tape, a floppy disk, an optical data storage device, and the like.

The computer storage medium enables the mobile terminal to execute an information processing method when the executable instructions in the storage medium are executed by a processor of a mobile terminal, the method including:

determining that a trigger event of a first identity recognition module in a terminal is a preset trigger event, and determining that a second identity recognition module in the terminal has an effective TA value; then, controlling the first identity recognition module not to initiate random access, and determining the TA value of the second identity recognition module as the TA value of the first identity recognition module.

As one example, the executable instructions are configured to perform:

determining that the trigger event is a non-preset trigger event, and then, controlling the first identity recognition module to initiate random access to a communication network to obtain an effective TA value; or determining that the trigger event is a preset trigger event, and determining that the second identity recognition module does not have an effective TA value, and then, controlling the first identity recognition module to initiate random access to a communication network to obtain an effective TA value.

In the above solution, the preset trigger event includes:

DL or UL data arrival during RRC_connected when an UL synchronization status is non-synchronized.

As one example, the executable instructions are configured to perform:

whether the trigger event of the first identity recognition module is a preset trigger event is first determined, and in response to the trigger event is the preset trigger event, whether the second identity recognition module has an effective TA value is then determined.

As one example, the executable instructions are configured to perform:

determining whether the second identity recognition module has a TA value;

determining that the second identity recognition module does not have an effective TA value if the second identity recognition module does not have the TA value; and determining whether the TA value is an effective TA value according to a communication status of the second identity recognition module if the second identity recognition module has the TA value.

As one example, the executable instructions are configured to perform:

determining that the TA value of the second identity recognition module is an effective TA value if the second identity recognition module is in a state of being in data transmission with its communication network.

As one example, the executable instructions are configured to perform:

determining that the TA value of the second identity recognition module is an ineffective TA value, when the second identity recognition module is in an idle state or an inactive state, or in a non-synchronized status in a connected state.

As one example, the executable instructions are configured to perform:

informing the first identity recognition module about the TA value, so that the first identity recognition module uses the TA value for transmission of uplink data after determining the TA value of the second identity recognition module as the TA value of the first identity recognition module.

As one example, the executable instructions are configured to perform:

informing the first identity recognition module about the TA value, so that the first identity recognition module uses the TA value for reception of downlink data after determining the TA value of the second identity recognition module as the TA value of the first identity recognition module.

It should be understood by those skilled in the art that the functions of each program in the storage medium of the present example can be understood by referring to the related description of the information processing method described in the example.

The technical solutions recorded in the examples of the present disclosure can be combined arbitrarily without conflict.

After considering the description and practicing the disclosure disclosed herein, those skilled in the art will easily think of other examples of the disclosure. The disclosure is intended to cover any variations, uses or adaptations of the disclosure following the general principles of the disclosure and including the common general knowledge or frequently used technical means in the technical field not disclosed in the disclosure. The description and examples are only regarded as exemplary, and the true scope and spirit of the disclosure are pointed out by the following claims.

It should be understood that the disclosure is not limited to the precise structure that has been described above and shown in the drawings, and that various modifications and changes may be made without departing from the scope thereof. The scope of the disclosure is limited only by the appended claims.

INDUSTRIAL APPLICABILITY

According to the examples of the present disclosure, when the trigger event of the first identity recognition module in the terminal is the preset trigger event, if the second identity recognition module in the terminal has an effective TA value, the first identity recognition module obtains the TA value of the second identity recognition module and no longer initiates random access based on the trigger event to obtain the TA value, thus avoiding waste of resources, including network resources and terminal power.

What is claimed is:

1. An information processing method, comprising:
   determining, a trigger event of a first identity recognition module in a terminal is a preset trigger event, wherein the preset trigger event will cause a user equipment (UE) to initiate random access to obtain a timing advance (TA) value of the first identity recognition module,
   determining that a second identity recognition module in the terminal has an effective TA value in response to determining that the second identity recognition module has a TA value and the second identity recognition module is in data transmission with a communication network corresponding to the second identity recognition module,
   in response to determining that the second identity recognition module has the effective TA value, controlling the first identity recognition module not to initiate random access, determining the effective TA value of the second identity recognition module as the TA value of the first identity recognition module, and informing the first identity recognition module of the effective TA value of the second identity recognition module, so that the first identity recognition module uses the effective TA value of the second identity recognition module for transmission of uplink data or reception of downlink data-wherein the effective TA value of the second identity recognition module is used for the first identity recognition module to transmit uplink data or receive downlink data.

2. The information processing method according to claim 1, wherein the method further comprises:
   determining that the trigger event is a non-preset trigger event; and
   controlling the first identity recognition module to initiate random access to a communication network to obtain the effective TA value of the first identity recognition module.

3. The information processing method according to claim 1, wherein the preset trigger event comprises:
   downlink (DL) or uplink (UL) data arrival during radio RRC CONNECTED when an uplink (UL) synchronization status is non-synchronized.

4. The information processing method according to claim 1, further comprising:
   determining that the TA value of the second identity recognition module is an ineffective TA value when the second identity recognition module is in an idle state or an inactive state, or in a non-synchronized status in a connected state.

5. The information processing method according to claim 1, wherein the communication network corresponding to the first identity recognition module and the communication network corresponding to the second identity recognition module belong to a same operator network.

6. An information processing apparatus, comprising:
   a processor; and
   a memory, configured to store processor-executable instructions;
   wherein the processor is configured to:
   determine, a trigger event of a first identity recognition module in a terminal is a preset trigger event, the preset trigger event is configured to cause a user equipment (UE) to initiate random access to obtain a timing advance (TA) value of the first identity recognition module, determine that a second identity recognition module in the terminal has an effective TA value in response to determining that the second identity recognition module has a TA value and the second identity recognition module is in data transmission with a communication network corresponding to the second identity recognition module, in response to determining that the second identity recognition module has the effective TA value, control the first identity recognition module not to initiate random access, determine the effective TA value of the second identity recognition module as the TA value of the first identity recognition module for subsequent data transmission of the first identification module, and inform the first identity recognition module of the effective TA value of the second identity recognition module, wherein the effective TA value of the second identity recognition module is used for the first identity recognition module to transmit uplink data or receive downlink data.

7. The information processing apparatus according to claim 6, where in the processor is further configured to:
  determine that the trigger event is a non-preset trigger event; and
  controlling the first identity recognition module to initiate random access to a communication network to obtain the TA value of the first identity recognition module.

8. The information processing method according to claim 1, wherein the preset trigger event comprises:
  downlink (DL) or uplink (UL) data arrival during RRC CONNECTED when an uplink (UL) synchronization status is non-synchronized.

9. The information processing apparatus according to claim 6, wherein the processor further configured to:
  determine that the second identity recognition module has a TA value;
  determine that the TA value is the effective TA value according to a communication status of the second identity recognition module.

10. The information processing apparatus according to claim 9, wherein the processor further configured to:
  determine that the TA value of the second identity recognition module is the effective TA value when the second identity recognition module is in a state of being in data transmission with its communication network.

11. The information processing apparatus according to claim 9, wherein the processor further configured to:
  determine the TA value of the second identity recognition module is an ineffective TA value when the second identity recognition module is in an idle state or an inactive state, or in a non-synchronized status in a connected state.

12. The information processing apparatus according to claim 6, wherein the communication network corresponding to the first identity recognition module and the communication network corresponding to the second identity recognition module belong to a same operator network.

13. A non-transitory computer-readable storage medium, having executable instructions stored therein, wherein when the executable instructions are executed by a processor, the processor configured to:
  determine that a trigger event of a first identity recognition module in a terminal is a preset trigger event, the preset trigger event is configured to cause a user equipment (UE) to initiate random access to obtain a timing advance (TA) value of the first identity recognition module,
  determine that a second identity recognition module in the terminal has an effective TA value in response to determining that the second identity recognition module has a TA value and the second identity recognition module is in data transmission with a communication network corresponding to the second identity recognition module,
  in response to determining that the second identity recognition module has the effective TA value, control the first identity recognition module not to initiate random access,
  determine the effective TA value of the second identity recognition module as the TA value of the first identity recognition module, and
  inform the first identity recognition module of the effective TA value of the second identity recognition module, wherein the effective TA value of the second identity recognition module is used for the first identity recognition module to transmit uplink data or receive downlink data.

* * * * *